(12) United States Patent
Small et al.

(10) Patent No.: US 6,406,164 B1
(45) Date of Patent: Jun. 18, 2002

(54) SAFETY LIGHT

(75) Inventors: Jeffrey R. Small, Wilmington; Terrence P. McCoy, Castle Hayne; David A. Theisen, Hampstead, all of NC (US)

(73) Assignee: Marpac Corporation, Wilmington, NC (US)

( * ) Notice: Subject to any disclaimer, the term of this patent is extended or adjusted under 35 U.S.C. 154(b) by 0 days.

(21) Appl. No.: 09/563,641

(22) Filed: May 2, 2000

(51) Int. Cl.⁷ .............................. H04M 1/22; F21L 4/00
(52) U.S. Cl. ..................... 362/191; 362/285; 362/396; 362/397; 362/398; 362/486; 362/549
(58) Field of Search ............................... 362/191, 285, 362/396, 397, 398, 190, 226, 430, 457, 157, 158, 486, 549, 186, 253; 248/683, 206.5, 127, 174; 383/9, 106; 206/806, 419, 418

(56) References Cited

U.S. PATENT DOCUMENTS

| | | | |
|---|---|---|---|
| 4,047,150 A | | 9/1977 | Kelley |
| 4,428,033 A | * | 1/1984 | McBride ..................... 362/183 |
| 4,489,366 A | * | 12/1984 | Rozniecki ................... 362/270 |
| 5,109,322 A | | 4/1992 | Loughlin |
| 5,294,924 A | | 3/1994 | Dydzk |
| 5,521,595 A | | 5/1996 | Totten et al. |
| 5,577,824 A | | 11/1996 | Wright |
| 5,627,513 A | | 5/1997 | Weed et al. |
| 5,651,636 A | | 7/1997 | Yeh |
| 5,685,631 A | | 11/1997 | Dobert et al. |
| 5,797,672 A | | 8/1998 | Dobert |
| 5,984,488 A | | 11/1999 | Tung |
| 6,279,747 B1 | * | 8/2001 | Zegarra ..................... 206/579 |

\* cited by examiner

Primary Examiner—Thomas M. Sember
Assistant Examiner—David V. Hobden
(74) Attorney, Agent, or Firm—MacCord Mason PLLC

(57) ABSTRACT

A safety light kit is described that includes a plurality of battery-powered safety lights and an plurality of safety light stands, each of the stands including a ferrous mounting plate, and a support member adapted to support the ferrous mounting plate in a generally upright orientation on a horizontal surface. The kit can also include additional mounting mechanisms such as a rectangular plate having a front face for attachment of a light, and a rear surface for use in attaching said mounting mechanism to a generally vertical surface and/or a flexible pouch having a safety light-receiving cavity with a transparent front face. The lights can also be used in combination with a stand or other mounting mechanism independent of the kit.

22 Claims, 3 Drawing Sheets

SAFETY LIGHT

BACKGROUND OF THE INVENTION (1) Field of the Invention

The present invention relates generally to battery-powered safety lights, and in particular to safety light systems that include mounting mechanisms to expand the utility of such lights. The invention also contemplates a combination of safety lights with one or more of these mounting mechanisms, and a safety light kit that can be carried in a vehicle for emergency use.

(2) Description of the Prior Art

The prior art describes various battery-powered lights that can be used to provide a warning signal, or to temporarily supplement or replace an existing light. Such lights are commonly used in connection with cars, trucks, boats, and other vehicles, to replace a broken tail light, or to serve as a hazardous condition signal in the event that the vehicle is disabled.

These safety lights are normally comprised of a housing that encloses a battery, a light emitter, circuitry to connect the battery and emitter, and a switch to control current flow through the circuit. The circuit may be adapted to transmit current in a continuous or intermittent manner, so that the light emitter will be activated continuously, or in a flashing mode, with the switch being used to determine which mode is employed.

Different attachment or mounting mechanisms have been used to support or attach the light to a desired surface. For example, the light may include one or more permanent magnets on the back surface of the light housing, so that the light can be attached to a ferrous surface, such as the fender, bumper, trunk, or other surface of a vehicle. With this attachment means, the light can be used to replace a broken taillight or can be used, when properly positioned on the vehicle, to warn others when the vehicle is disabled. A light with attachment magnets is shown, for example, in U.S. Pat. No. 5,685,631 to Dolbert et al. and U.S. Pat. No. 5,797,672 to Dolbert.

Other types of mounting mechanisms have also been employed. For example, the above Dolbert patents describe the addition of a pivotal, U-shaped frame attached to the back of the light, so that the light can be supported in a generally upright position on a horizontal surface. Other types of clips, such as spring clips for attaching lights to a cap or shirt, are also known in the art.

Existing mounting means restrict the utility of these safety lights to a limited number of circumstances. For example, ferrous surfaces may not be available for attachment of magnets, or available ferrous surfaces may be inappropriately oriented. Also, it may be desirable to position one or more of the lights at a distance from the vehicle, so that the lights are easily visible when the vehicle is disabled. A pivotal frame on the back of the light is not always adequate to provide this desired visibility, or to securely support the light on available surfaces.

Additional mounting means that could be compactly carried with safety lights of the above design would greatly increase the utility of these lights, and provide greater safety and convenience.

SUMMARY OF THE INVENTION

The present invention generally comprises the combination of one or more battery powered safety lights and one or more types of mounting means as herein described. The invention further contemplates a safety light kit that can be easily carried in vehicles for emergency use.

The lights forming a part of the invention are commercially available, and do not per se form a part of the invention. The major components of these lights are a housing, a light emitter, circuitry to connect the battery and emitter, and a control switch.

In the preferred embodiments, the housing is preferably a rectangular housing having a width of from about 6 to about 8 inches, a height of from about 4 to about 6 inches, and a thickness of from about 1.5 to about 2.5 inches. The housing is preferably comprised of a molded back and front sections that join to form an interior cavity to enclose the other components.

The housing sections may be molded of various plastics known to one skilled in this art, with the front section being molded at least in part of a transparent, optionally colored, plastic, with the light emitters being mounted behind the transparent section. The transparent section may be shaped to increase light visibility. Other housing shapes, such as round or triangular housings, are also contemplated by the present invention. While the light emitter may be a florescent or incandescent bulb, the emitter is preferably one or more light emitting diodes (LEDs) to achieve the maximum light emission with minimum battery drain, thereby prolonging the use of the light between battery replacements.

The circuit connecting the light emitter or emitters and the battery may include a flasher circuit of known configuration to determine whether current is provided to the light emitter in a continuous or discontinuous manner, so that the emitter will display continuously, or in a strobe-like manner. A switch, such as a pushbutton switch, controls the flow of current through the circuit and is used to select between continuous and discontinuous emission.

The present invention, in one embodiment, relates to the combination of a safety light and a safety light stand comprised of a ferrous mounting plate and a support member adapted to hold the mounting plate in a generally upright position. For optimum visibility, the mounting plate is preferably inclined at an angle of from about 10° to about 35° when the stand is positioned on a horizontal surface. The mounting plate should be of dimensions such that the light can be securely attached to the outer face of the plate using magnets, with the light being positioned at a height permitting visibility from a long distance, while being stable during adverse conditions.

Thus, the stand will normally have a horizontal dimension equal to the width of a light mounted thereon, ±20%, and a height equal to approximately twice the height of the light, ±20%.

For example, the mounting surface may have a width of from about 6 to about 8 inches, and a height of from about 4 to about 6 inches. These dimensions not only permit mounting of a light of the foregoing dimensions at a visible level on the upper portion of the face of the mounting plate, but also provides a space on the lower portion of the face for the inclusion of a reflective strip beneath the light to supplement the light, and also alert others to the purpose of the light. For example, a reflective strip with alternating bands of contrasting colors, e.g., orange alternating with black, or red alternating with white, can be adhesively secured to the lower portion of the mounting plate face.

The stand support member may be formed in various ways, so long as the base holds the mounting surface in the desired position. The support member may be generally upright when the stand is positioned on a horizontal surface, with an upper edge joining the upper edge of the mounting plate. Alternatively, the support member can be positioned horizontally when the stand is positioned on a horizontal surface, with a front edge joined to the lower edge of the mounting plate.

In a preferred embodiment, the stand is comprised of rectangular mounting and support members that are of approximately the same dimensions, with the upper edges of the members being joined at an angle of from about 20° to about 70°. Thus, when the lower edges of the members are positioned on a horizontal surface, the members are inclined toward each other at an angle of from about 10° to about 35° from vertical. Each member may include surface engagement tabs extending downwardly from its lower edge. With this configuration, either or both members can be used to mount a light. Other configurations will be apparent to one skilled in the art after reading the description of the invention.

A single light may be insufficient to warn others of a hazardous condition, such as when a vehicle is disabled along the side of a highway. In these circumstances, it is necessary to mount a plurality of lights at various locations around the perimeter of the vehicle. Thus, the present invention also contemplates an emergency kit that can be stored in the vehicle trunk or other storage area.

This kit includes a plurality of the above lights, a plurality of mounting stands, and a storage box for holding the lights and stands. The box is preferably comprised of hinged lower and upper sections held together by a latch when in the closed position, with a carrying handle on the top of the upper section, and a resilient material to hold the lights and stands securely within the box. Preferably a first section of resilient material having dimension conforming to the interior cavity of the lower box section is positioned within the lower box section cavity.

This lower resilient section may include a plurality of light-receiving cavities, each sized for insertion of a light, and a stand-receiving cavity sized for insertion of a number of stacked identical stands equal to the number of lights. The depths of the cavities may be equal to about one-half of the dimension of the lights or stands, so that the other half of the lights and stands extend above the lower resilient section for easy insertion and subsequent removal.

In some instances, it may be desirable to position one or more of the lights on a vertical and/or non-ferrous surface. For example, it may be desirable to position the light on a wall, a tree, or on the end of an item that extends from the rear of a vehicle. For these purposes the invention also includes one or more additional mounting means that can be used separately from the above mounting means, or included in the above kit.

One alternative mounting means comprises a mounting plate that has vertical and horizontal dimensions approximately equal to the corresponding vertical and horizontal dimensions of the light. The mounting plate includes means to secure the light to the plate front surface, and means to secure the plate to another object. When using a ferrous plate, the light may be attached with permanent magnets on the back of the light. However, if the plate is nonferrous, or if magnets are not present on the light, the plate may include other light attachment means, such as light engaging clips.

The means used to attach the plate to an object will depend on the nature of the object. For example, if the object is of wood or other penetrable material, the plate can include attachment holes so that the plate can be secured with nails, screws or other fasteners. If the surface is a smooth, non-ferrous surface, the plate can include one or more suction cups that extend to the rear of the plate.

In some instances, use of a mounting plate may not be feasible. For example, the dimension of the surface may be too small, such as the end of lumber or logs that project from the rear of a vehicle. Also, it may be desired to protect the light from water, such as when the light is to be mounted on a boat. In these instances, the invention contemplates the use of a mounting means in the shape of clear flexible pouch.

Specifically, the pouch is comprised of first and second sides joined to form an interior cavity with a closeable opening for insertion of a light into the pouch cavity. The dimensions of the pouch cavity will be slightly larger than the corresponding dimensions of the light to be inserted, so that there will be sufficient space in the cavity to receive the light. At least one side of the pouch is transparent so that the light will shine through the pouch wall.

The pouch may also include outwardly extending attachment flaps for use in attaching the pouch to a surface. These flaps may include openings or grommets for use in inserting a nail, screw or other fastener, to secure the pouch and light to the desired object.

One or more of the above-described lights can be provided as part of a kit one or any combination of the above mounting means, depending upon the expected end uses of the lights. For most purposes, the a kit will be comprised of a closeable container, a plurality of lights, an equal number of stands, and optionally, one more mounting means selected from mounting plates and mounting pouches.

Accordingly, one aspect of the present invention is to provide a safety light kit comprising a plurality of battery powered safety lights; and an plurality of safety light stands, each stand including a ferrous mounting plate, and a support member adapted to support the ferrous mounting plate in a generally upright orientation on a horizontal surface.

Another aspect of the present invention is to provide a safety light system comprising a battery-powered safety light; and a light stand including a mounting plate for attachment of the light, and a support member adapted to support the mounting plate in a generally upright orientation on a horizontal surface.

Still another aspect of the present invention is to provide a safety light system comprising a battery-powered safety light; and a mounting plate having a front face for attachment of the light, and a rear face including attachment means for attaching the plate to a generally vertical surface.

Another aspect of the present invention is to provide a safety light system comprising a battery-powered safety light; and a pouch having a safety light-receiving cavity with a transparent front surface.

These and other aspects of the present invention will become apparent to those skilled in the art after a reading of the following description of the preferred embodiment.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
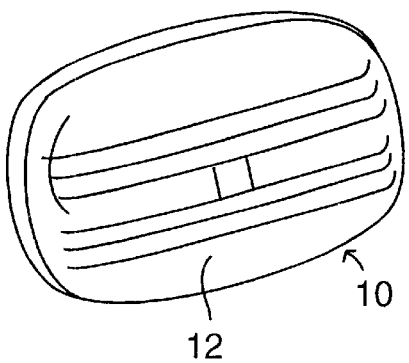
FIG. 1 is a perspective view of the front of a typical battery-powered safety light.
Figure 2:
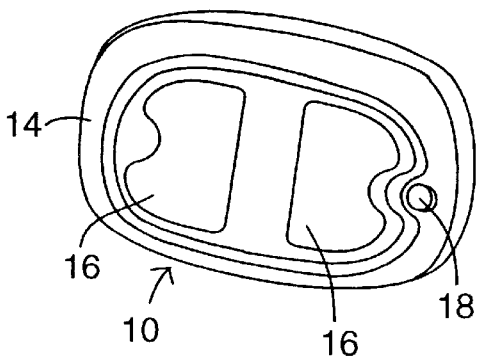
FIG. 2 is a perspective view of the back of a typical battery-powered safety light.

Exemplary safety lights, generally 10, of the type used with the mounting mechanisms of the invention are best illustrated in FIGS. 1 and 2, and are comprised of molded, mating front and back housing sections 12 and 14, respectively, that form an interior cavity to enclose light emitting diodes, circuitry, and a battery. These internal elements are of conventional design, and are not illustrated herein.

Front housing section 12 is molded of a transparent plastic to permit light transmission, while rear housing section 14 is molded of an opaque plastic. Rear housing section 14 includes a pair of permanent magnets 16 and a pushbutton switch 18.

Figure 3:
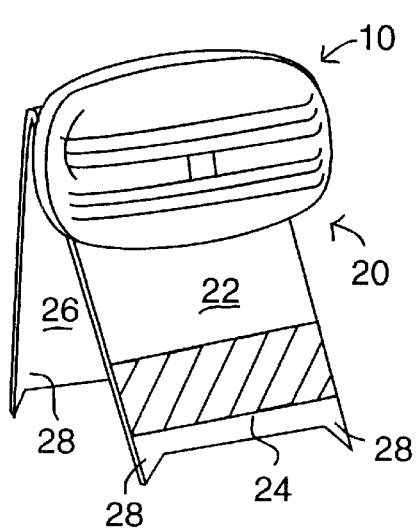
FIG. 3 is perspective view of a light and stand system.
Figure 4:
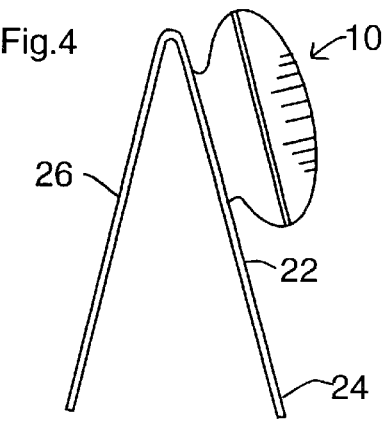
FIG. 4 is a side view of the light and stand system of FIG. 3.

FIGS. 3 and 4 illustrate a safety light 10 and a stand, generally 20, comprised of rectangular, ferrous, safety light mounting plate 22, to support a safety light 10, magnetically held to the upper portion of the face of plate 22, and a reflective strip 24 with alternating color bands adhered to the lower portion of the face of plate 22.

A rectangular support member 26 having dimensions approximately equal to the dimensions of plate 22 is integrally attached at its upper edge to the upper edge of mounting plate 22 at an angle of from about 10° to about 35°, so that mounting plate 22 is inclined rearwardly at an angle of from about 10° to about 35° from vertical. Tabs 28 extend downwardly from the lower edges of mounting plate 22 and support member 26 to engage the surface upon which stand 20 is supported.

Figure 5:
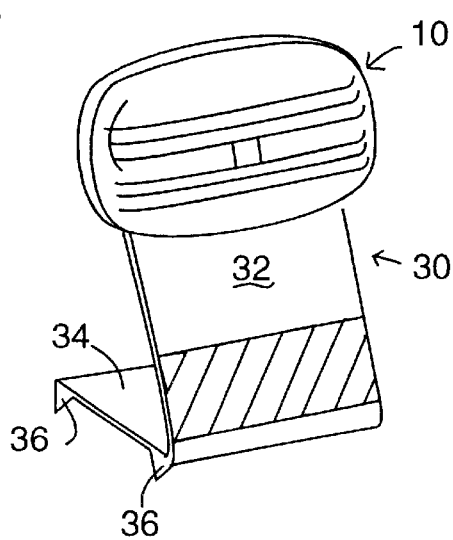
FIG. 5 is perspective view of an alternative light and stand system.
Figure 6:
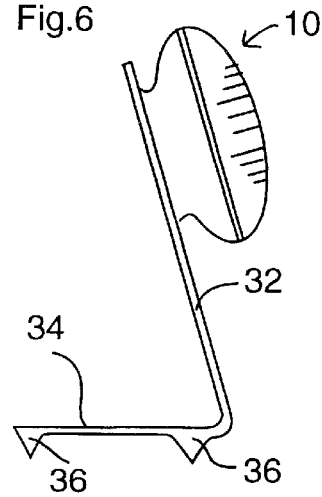
FIG. 6 is a side view of the light and stand system of FIG. 5.

In an alternative embodiment illustrated in FIGS. 5 and 6, stand, generally 30, is comprised of a mounting plate 32 and a horizontal support member 34 that has a front edge integral with the lower edge of mounting plate 32. Support member 34 includes downwardly extending tabs 36.

Figure 7:
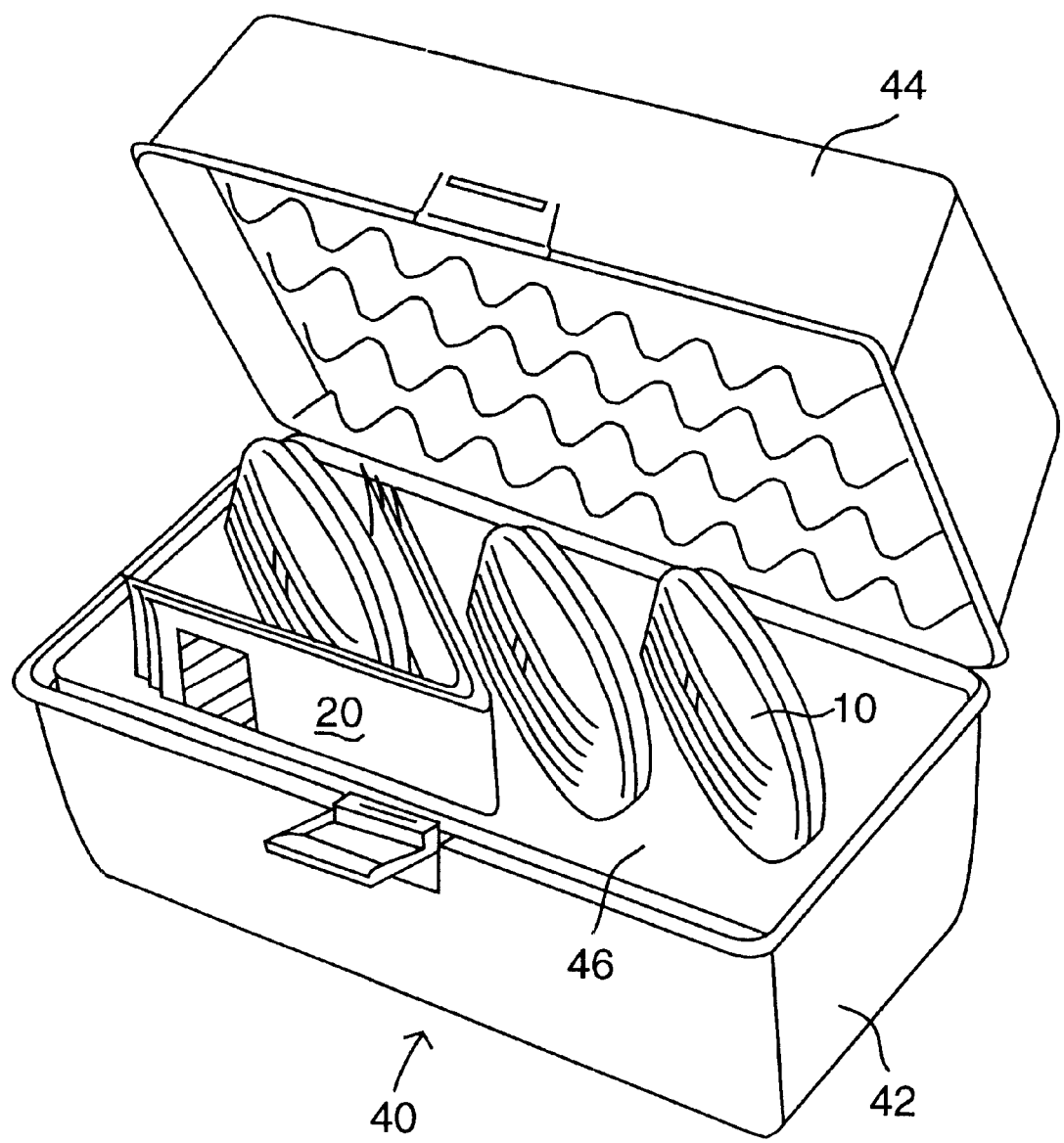
FIG. 7 is a perspective view of a safety light kit.

A safety light kit, generally 40, is illustrated in FIG. 7. Kit 40, designed for storage in the trunk or other storage compartment of a vehicle, includes a plurality of safety lights 10, a plurality of mounting stands 20, and a storage container having a lower section 42, and a hinged lid 44. A liner 46 constructed of foamed plastic fits within lower section 42. Liner 46 includes a plurality of light-receiving cavities sized for insertion of lights 10, and a stand-receiving cavity sized for insertion of a number of stacked identical stands 20 equal to the number of lights 10.

Figure 8:
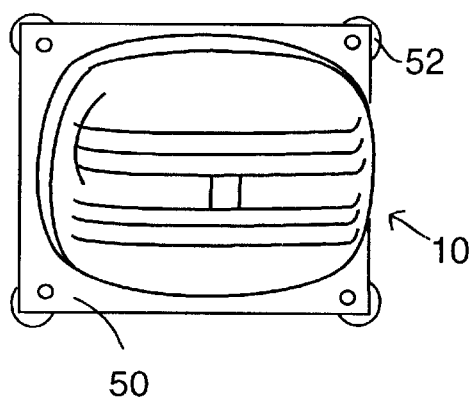
FIG. 8 is a perspective view of a light and an alternative mount.
Figure 9:
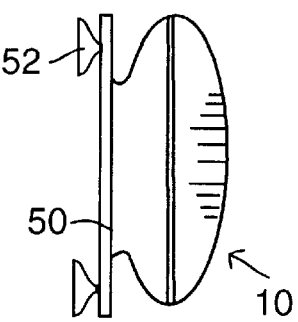
FIG. 9 is a side view of the light and mount system of FIG. 8.

FIGS. 8 and 9 illustrate a mounting mechanism comprised of a rectangular, ferrous mounting plate 50 having vertical and horizontal dimensions approximately equal to the corresponding vertical and horizontal dimensions of safety light 10. Plate 50 includes suction cups 52 for attachment of plate 50 to a nonferrous surface.

Figure 10:
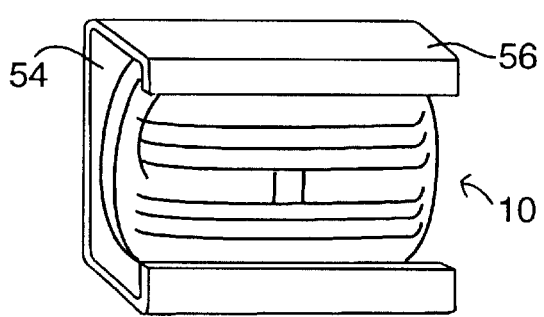
FIG. 10 is a perspective view of a light and another mount.
Figure 11:
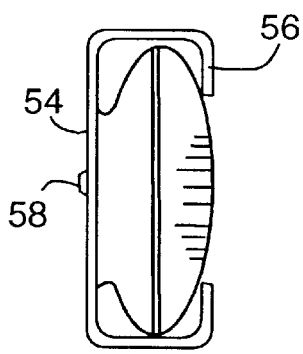
FIG. 11 is a side view of the light and mount system of FIG. 10.

A modified embodiment of plate 50 is illustrated in FIGS. 10 and 11. As shown, light 10 is secured to plate 54 by clips 56. Plate 54 includes centrally located holes 58 that can be used to secure plate 54 to a wooden or other penetrable material with nails, screws or other fasteners. These holes can also be adjacent the corners as shown in plate 50.

In some instances, use of a mounting plate may not be feasible. For example, the dimension of the surface may be too small, such as the end of lumber or logs that project from the rear of a vehicle. Also, it may be desired to protect the light from water, such as when the light is to be mounted on a boat. In these instances, the invention contemplates enclosing the light in a clear flexible pouch that is attachable to a vertical surface.

Figure 12:
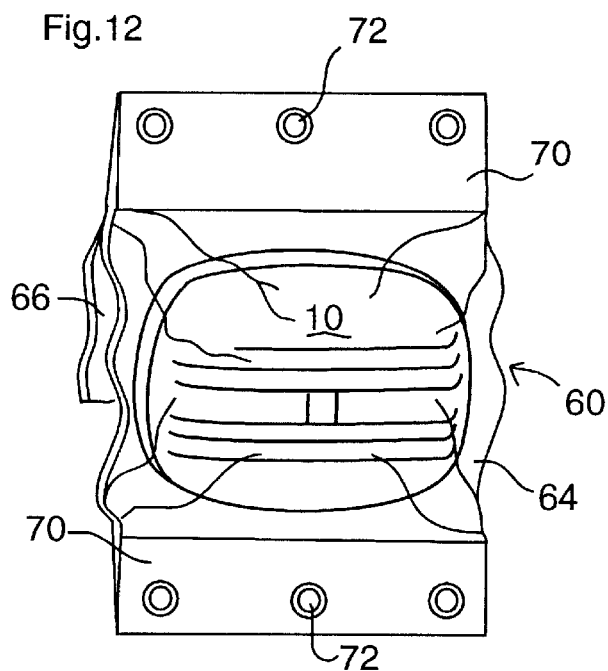
FIG. 12 is a perspective view of a light and a pouch mounting means.
Figure 13:
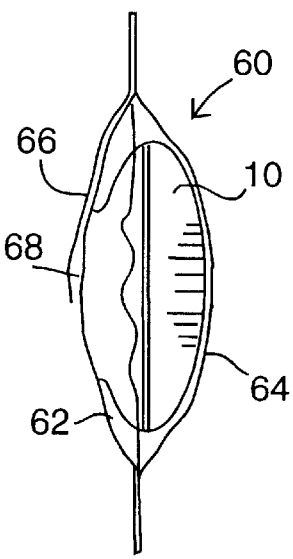
FIG. 13 is a side view of the light and pouch system of FIG. 12.

FIGS. 12 and 13 illustrate a pouch 60 that can be used to hold a light 10, while attaching the light to a surface, such as the end of a object extending from the rear of a vehicle. Pouch 60 is comprised of flexible, back and front sheets 62 and 64, respectively, joined at their side and bottom peripheries to form a light receiving cavity. At least front sheet 64 is transparent. A cover 66 extends over the opening into the cavity, and can be secured in place with a fastener 68, such as hook and loop fastener, to back sheet 62. Pouch 60 also includes outwardly extending attachment flaps 70 for use in attaching pouch 60 to a surface. Flaps 70 include grommeted openings 72 for insertion of nails, screws, a cord, or other fastener.

Kit 40 can also include one or more of mounting mechanisms 50, 54 and/or 60.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A safety light kit comprising:
  a) a plurality of battery-powered safety lights;
  b) a plurality of safety light stands, each of said stands including a ferrous mounting plate, and a support member adapted to support said ferrous mounting plate in a generally upright orientation when placed on a horizontal surface and;
  c) a container having a lower section and a cover, said lower section including a liner with pockets for receiving said lights and said stands.

2. The kit of claim 1 further including a mounting mechanism comprised of a rectangular ferrous plate having a front face for attachment of a light, and a rear surface for attaching said mounting mechanism to a generally vertical surface.

3. The kit of claim 1, further including a mounting mechanism comprised of a pouch having a safety light-receiving cavity with a transparent front surface.

4. The kit of claim 1, further including a mounting mechanism comprised of a rectangular plate having a front face for attachment of a safety light, clips for securing said light to said front face, and attachment means for securing said mounting mechanism to a generally vertical surface.

5. The kit of claim 1, further including a first mounting mechanism comprised of a plate with a face for attachment of a safety light and attachment means for securing said plate to a generally vertical surface, and a second mounting mechanism comprised of a pouch having a safety light-receiving cavity with a transparent front face.

6. A safety light system comprising:
   a) a battery-powered safety light; and
   b) a light standing including a mounting plate with a face for attachment of said light, and a support member adapted to support said mounting plate in a generally upright orientation when placed on a horizontal surface, said mounting plate having an upper portion for attachment of said light, a lower portion and a reflective strip attached to said lower portion.

7. The system of claim 6, wherein said light has a given width, and said mounting plate has a width equal to said given width, ±20%.

8. The system of claim 6, wherein said mounting plate has an upper edge, and said support member has an upper edge integral with said mounting plate upper edge, said mounting plate and said support member being of approximately the same dimensions, and joined at an angle of from about 20° to about 70°.

9. A safety light system comprising:
   a) a battery-powered safety light; and
   b) a mounting plate having a front face for attachment of said light, and a rear face including attachment means for attaching said plate to a generally vertical surface, said plate including clips for attaching said light to said front face.

10. The system of claim 9, wherein said light has a rear surface with permanent magnets on said rear surface, and said plate is ferrous.

11. The system of claim 9, wherein said attachment means is a suction cup.

12. A safety light system comprising:
    a battery-powered safety light; and
    b) a pouch having a safety light-receiving cavity with a transparent front surface.

13. The system of claim 12, further including at least one flap for attaching said pouch to a surface.

14. The system of claim 12, wherein said pouch includes a cover and a fastener to releasibly secure said cover to said pouch.

15. The system of claim 12, wherein said pouch is formed of flexible front and back plastic sheets having joined side and bottom peripheries.

16. A safety light system comprising:
    a) a battery-powered safety light; and
    b) a light stand including a mounting plate having an upper edge and a face for attachment of said light, and a support member having an upper edge integral with said mounting plate upper edge, said support member being adapted to support said mounting plate in a generally upright orientation when placed on a horizontal surface, said mounting plate and said support member have lower edges with downwardly extending tabs.

17. A safety light system comprising:
    a) a battery-powered safety light having a front transparent section, a rear section, and a permanent magnet on said rear section; and
    b) a light stand including a ferrous mounting plate with first upper and lower edges, and a face for attachment to the rear section of said light, and a support member with a second upper edge integral with said mounting plate first upper edge, and a second lower edge, said mounting plate being adapted to support said mounting plate face in a generally upright orientation when said lower edges are placed on a horizontal surface.

18. The safety light system of claim 17, wherein said first and second upper edges are joined at an angle of from about 20° to about 70°.

19. The system of claim 17, wherein said mounting plate and said support member are approximately of the same dimensions.

20. The system of claim 17, wherein said first and second lower edges include downwardly extending tabs.

21. The system of claim 17, wherein said mounting plate face has an upper portion for attachment of said light and a lower portion, said system further including a reflective strip attached to said lower portion.

22. A safety light system attachable to an object comprising:
    a) a battery-powered safety light having a front transparent section, a rear section, and first vertical and horizontal dimensions; and
    b) a nonferrous mounting plate having front and rear faces, and second vertical and horizontal dimensions approximately equal to said first vertical and horizontal dimensions, said plate having light attachment means for attaching said light rear section to said front face, and object attachment means for attaching said rear face to said object.

* * * * *